Dec. 23, 1952     E. J. FINIZIE     2,622,506
APPARATUS FOR COOKING FOOD
Filed Nov. 9, 1948     5 Sheets-Sheet 1

Inventor
Edmond J. Finizie
By Rockwell & Bartholow
ATTORNEYS

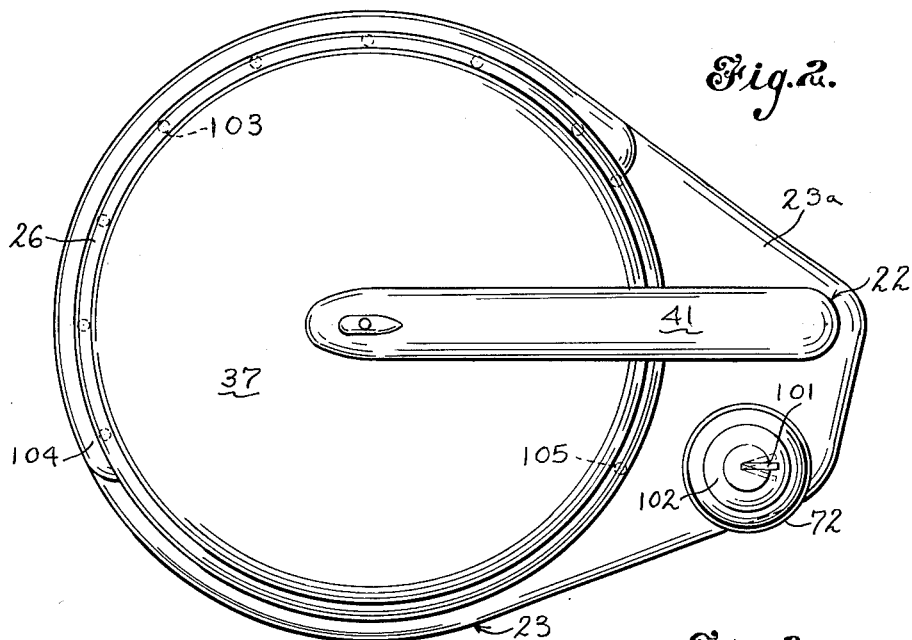
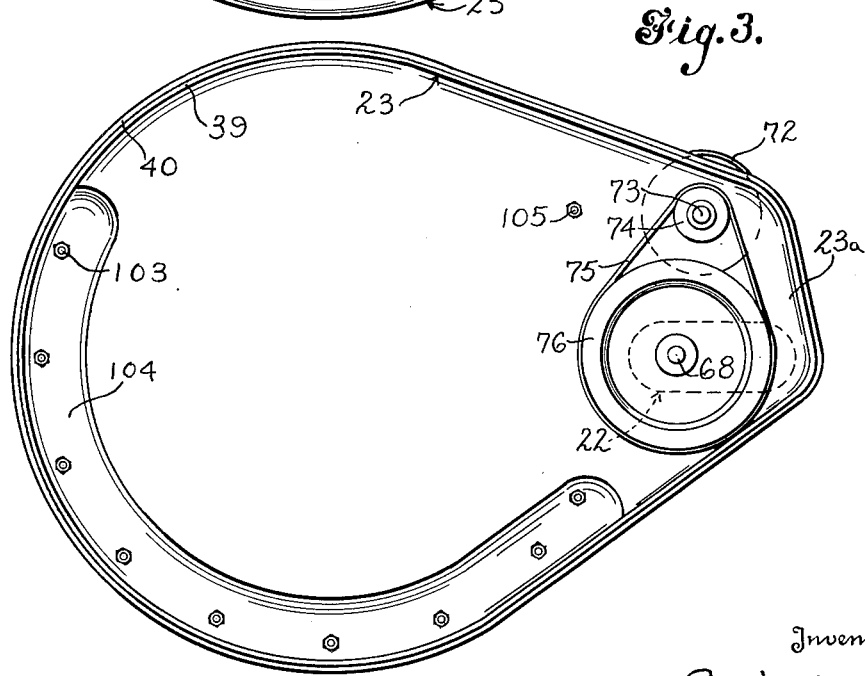

Dec. 23, 1952 E. J. FINIZIE 2,622,506
APPARATUS FOR COOKING FOOD
Filed Nov. 9, 1948 5 Sheets-Sheet 3
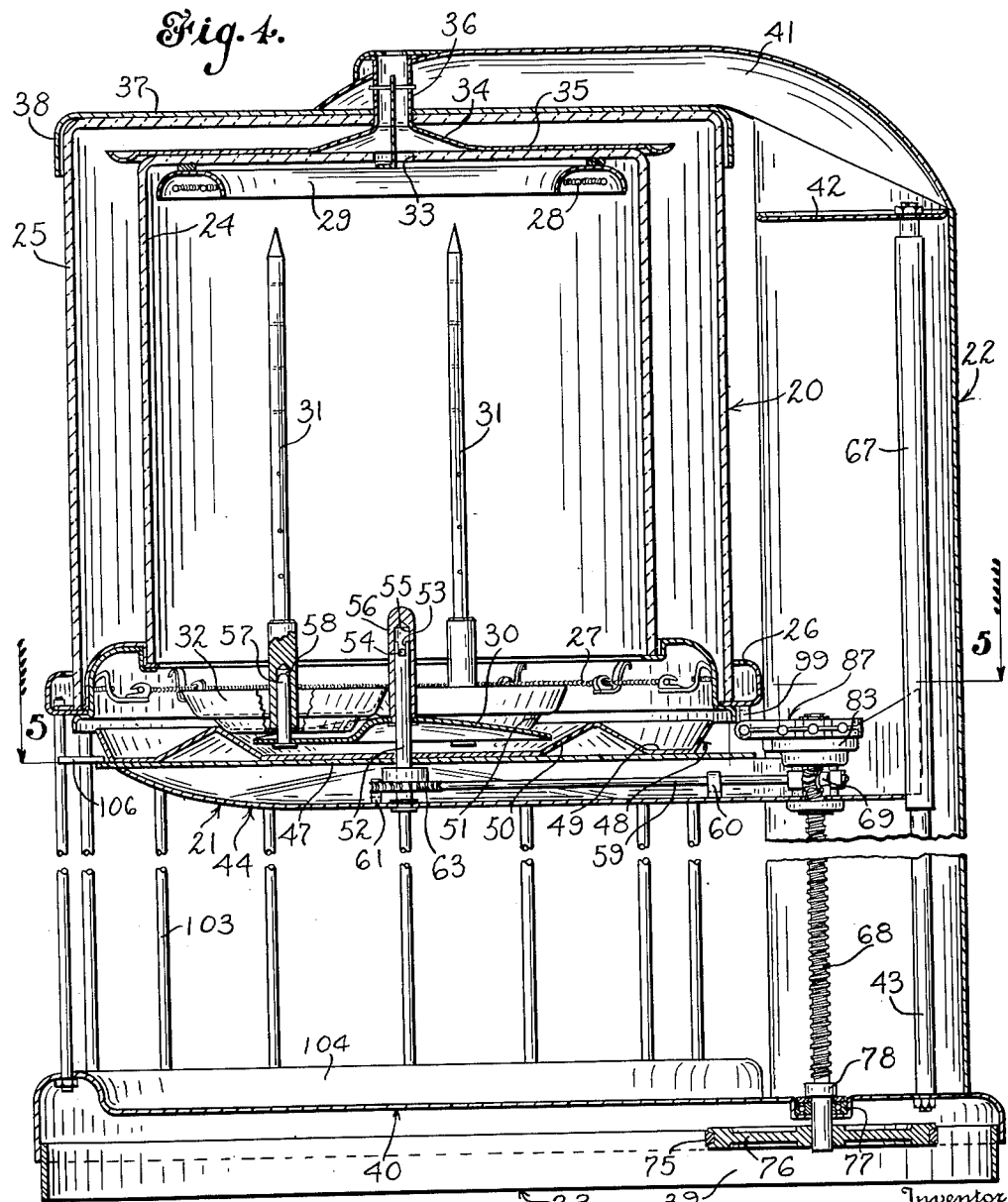
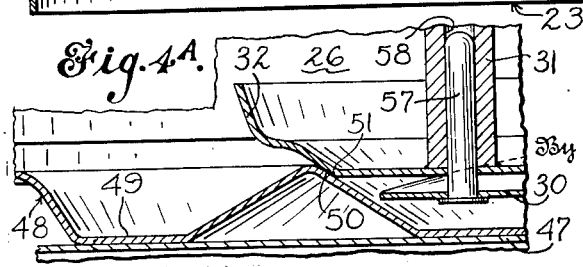

Dec. 23, 1952   E. J. FINIZIE   2,622,506
APPARATUS FOR COOKING FOOD
Filed Nov. 9, 1948   5 Sheets-Sheet 4
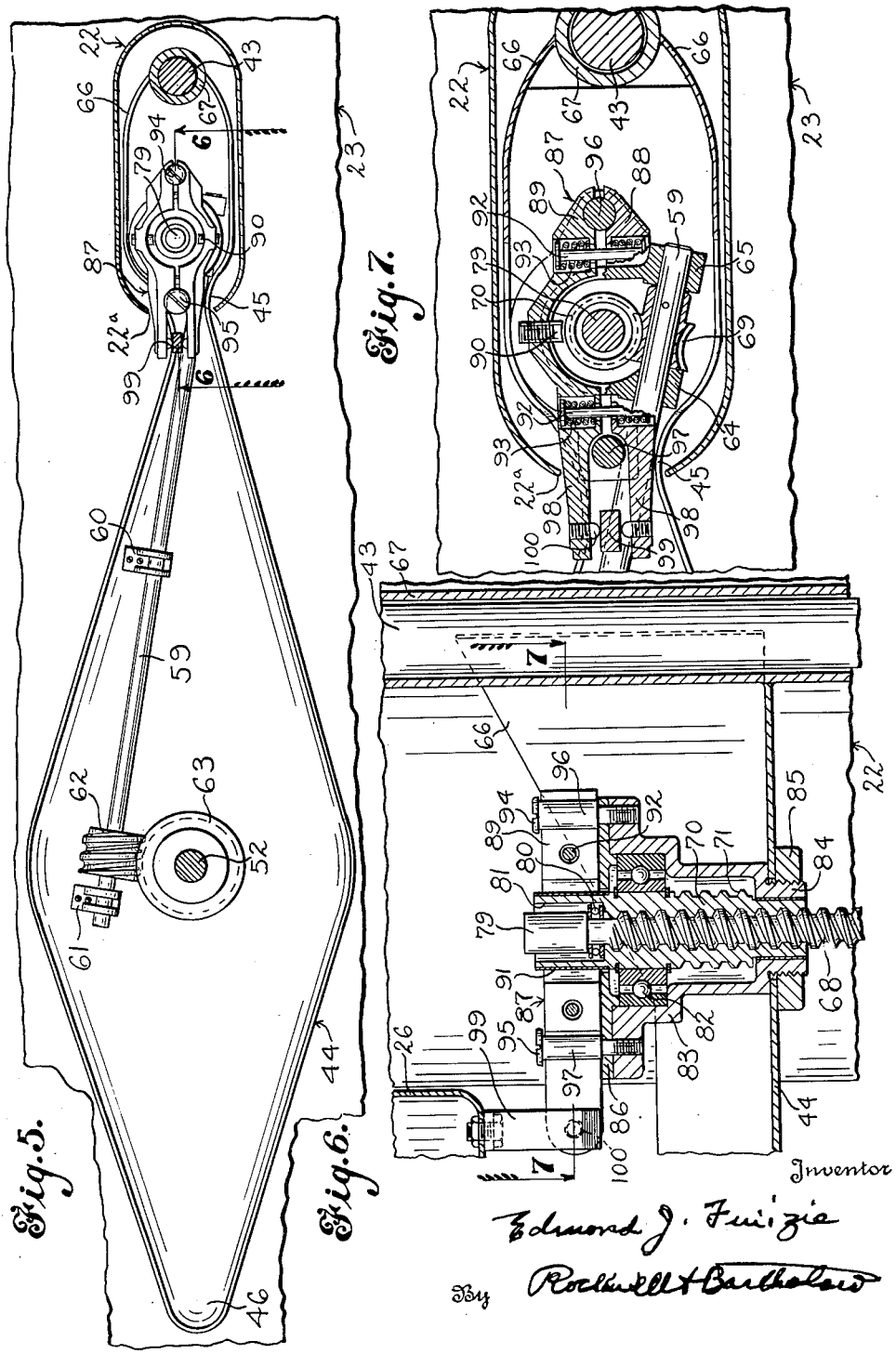

Dec. 23, 1952        E. J. FINIZIE        2,622,506
APPARATUS FOR COOKING FOOD

Filed Nov. 9, 1948        5 Sheets—Sheet 5

Inventor
Edmond J. Finizie
By Rockwell & Bartholow
ATTORNEYS

Patented Dec. 23, 1952

2,622,506

UNITED STATES PATENT OFFICE 2,622,506

APPARATUS FOR COOKING FOOD

Edmond J. Finizie, Bridgeport, Conn.

Application November 9, 1948, Serial No. 59,039

11 Claims. (Cl. 99—421)

One of the objects of the present invention is to provide an improved organization of the principal parts or elements of the apparatus, so as to simplify the structure and facilitate its manufacture and lower the cost.

Another object is to render the cooker more easily operable and make it more durable and increase its efficiency.

Another object is to provide improved means for raising and lowering the base of the cooking chamber, and improved means for rotating the central support carrying the spits.

To these and other ends the invention consists in the novel features and combinations of parts to be hereinafter described and pointed out in the claims.

In the accompanying drawings:

Fig. 2 is a top plan view;

Fig. 3 is a bottom view;

Fig. 4 is a vertical central section showing the base of the cooking chamber in the uppermost position in which position it closes the cooking chamber;

Fig. 4A is a detail showing on a larger scale certain parts illustrated in Fig. 4.

Fig. 5 is a section on line 5—5 of Fig. 4;

Fig. 6 is an enlarged section on line 6—6 of Fig. 5;

Fig. 7 is a section on line 7—7 of Fig. 6;

Figure 1:
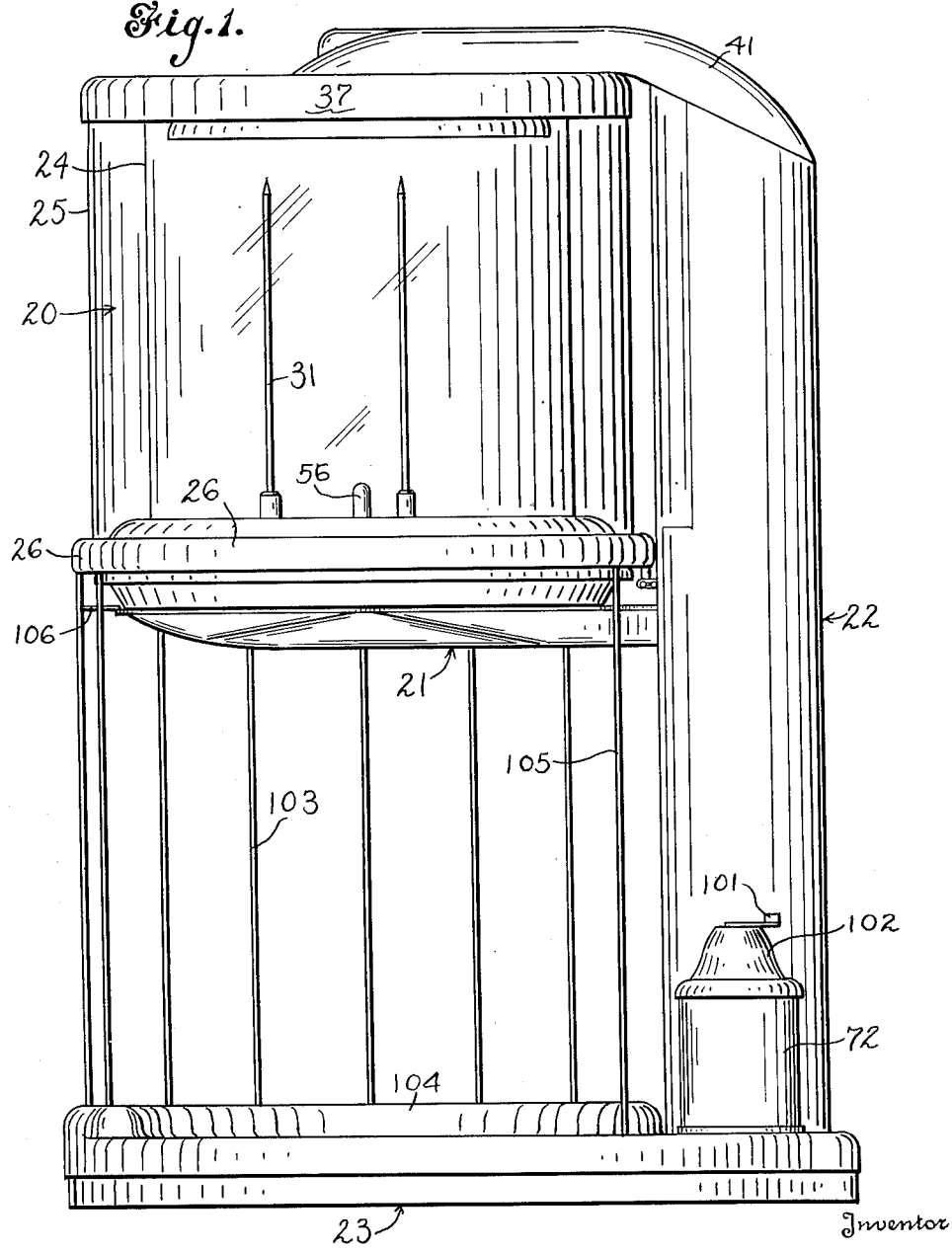
Fig. 1 is a side elevation of an electric cooker embodying my improvements.
Figure 8:
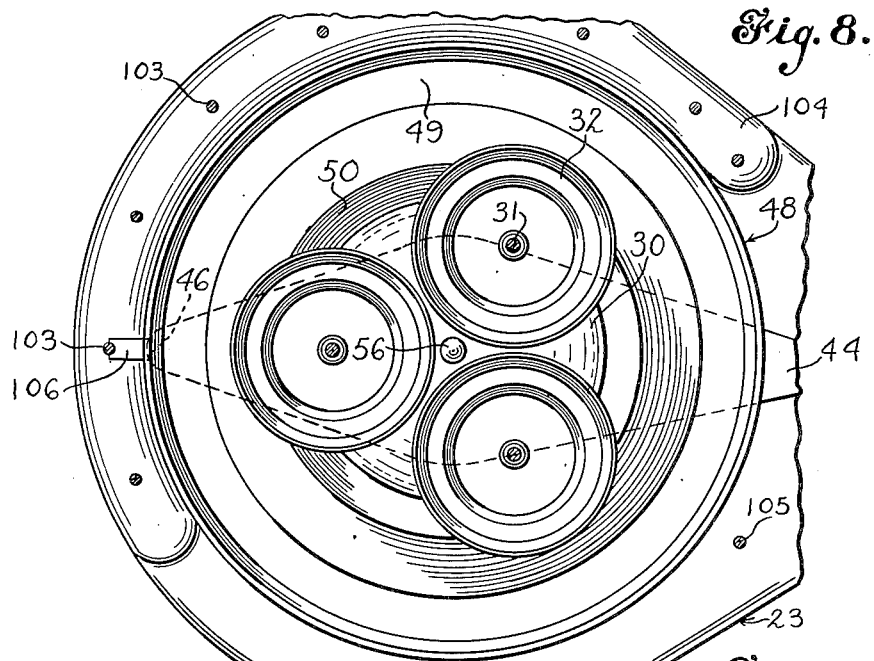
Fig. 8 is a section on line 8—8 of Fig. 9.

The machine selected for illustration is an electrical cooking apparatus of the general type disclosed in Patent No. 2,377,873, having a cooking chamber or receptacle, means for supporting the chamber, a base separate from the chamber for closing the same, interior heating means for the chamber, means for moving the base toward and from the closing position, food-supporting members operably associated with the base, and means cooperating with the base-moving means for rotating the food-supporting members by engagement thereof with the base. As in the patent just mentioned, the cooking chamber is in a casing open at the bottom comprising inner and outer glass walls spaced from each other, and the cooking chamber contains upper and lower electrical heating elements, with associated reflectors, and there is provided an annular member disposed in part exteriorly of the cooking chamber at the lower end thereof acting to position and secure the glass members. However, this annular member is supported by a structure including only a single side standard. This standard rests on top of a base at one side of the latter, in which standard is located a screw spindle that traverses the base member or closure member of the cooking chamber, and the annular member at the lower end of the chamber is supported chiefly by rod members interposed between the annular member and the base.

In the drawings, the cooking chamber is generally indicated at 20, the movable base member for the cooking chamber at 21, the side standard at 22, and the base for the apparatus as a whole, at 23. The inner glass shell of the cooking-chamber casing is indicated at 24, the outer shell at 25, the annular member at the lower end of the casing at 26, and the lower heating element at 27. The upper heating element is indicated at 28, and above it is positioned, within the cooking chamber, a reflector 29 in the form of an inverted trough.

The base member 21 of the cooking chamber is equipped at the upper part with a central rotating member 30, upon which are supported in this instance three revolving spits 31, each having associated with it a pan 32 which is rotated in the manner hereinafter described.

The inner glass shell 24 is equipped at the upper central part with a vent hole 33 leading upwardly into a funnel-shaped part 34 of a metal reflector 35, the major portion of which rests upon the top surface of the shell 24. The funnel-shaped part 34 leads upwardly to a vent pipe 36 which passes upwardly through a hole in the glass shell 25. An additional reflector of metal, indicated at 37, rests on top of the shell 25 and has a down-turned edge portion 38. The vent pipe 36 communicates at its upper end with the atmosphere.

Referring now to the details, the base 23 for the most part is round, but is provided with a lateral extension 23ᵃ upon which the standard 22 is supported. In this form the base consists of a lower part 39 and an upper part 40, and the base is open at the bottom, as shown in Fig. 4, for example, and closed at the top. The base sections 39 and 40 are preferably interconnected in a suitable manner, as by welding. The standard 22 is preferably made of sheet metal, and is open at the bottom and at the top, and in cross section has the shape shown in Fig. 5, the cross section being generally elliptical, the longer axis of the ellipse being in line with the center of the main portion of the base, and the standard having an open inner edge portion indicated at 22ª, for a purpose which will hereinafter appear. At the upper end of the standard a generally horizontal member 41 is attached, which positions the glass shells laterally with respect to the standard by being attached to the standard and also to the vent pipe 36 and the uppermost reflector 37. In this particular case the part 41, which serves as a lateral spacing arm, is constructed of sheet metal, and is suitably connected as by welding to the standard and to the adjacent parts positioned above the outermost glass shell.

Near the upper end of the standard 22 an internal bracket 42 is fixed in position in a suitable manner, as by welding, and between this bracket and the upper part of the extension of base 23 is extended a rigid vertical guide rod 43 which serves to guide the heating chamber base 21 in its vertical movement. The rod 43 is located within the closed end portion of the cross section of the standard, as shown in Fig. 5. The heating chamber base includes in its structure an elongated dish-shaped sheet metal member 44 which I term a "canoe," and which is located partly within the standard 22 and extends through the opening 22ª of the standard, and has a wider part, open at the top, underlying the heating chamber. As will be seen from Fig. 5, the canoe has a neck portion 45 entering the standard, and from the standard the width of the canoe is increased on a taper up to about the center of the heating chamber, and the width is then decreased on a taper to form a rounded free extremity or nose 46, which is located adjacent the peripheral portion of the heating chamber. The canoe 44 is provided with a flat sheet metal cover 47 of corresponding shape, and supported upon the cover 47 is a round shallow dish-like receptacle 48 having adjacent the periphery a liquid trough 49 of annular shape. This dish-like receptacle is provided adjacent the inner margin of the liquid trough with an upwardly and outwardly sloping annular surface 50, with which are engaged downwardly sloping external friction surfaces 51 provided on the spit pans 32. By this arrangement, rotation of supporting member 30 produces rotation of the pans 32, which are revolubly mounted on the member 30.

The canoe 44 is provided centrally with a stub shaft 52, which has a bearing in the bottom of the canoe and extends upwardly through openings in the cover 47 and receptacle 48. At its upper end the stub shaft 52 is provided with a notch 53, in which is received a crosspin 54 extending across a bore 55 in a sleeve member 56. The upper end of this sleeve member 56 is closed, but the lower end is open, and is attached in a suitable manner to the body of the supporting member 30, the arrangement being such that said member 30 is applicable to and removable from the stub shaft 52 by placing the sleeve member over the upper end of the stub shaft, the member 30, when placed in position, being rotated by the stub shaft.

The pans 32 are supported on member 30 by means of fixed upwardly extending pins 57 carried by the peripheral portion of member 30 and engaging sockets 58 provided in the lower end portions of the spits. As shown more particularly in Fig. 4ᴬ, each pin 57 extends upwardly through a perforation in the member 30, and is suitably fastened in place therein, as by welding, and the corresponding pan 32 and spit 31 are rigidly interconnected, as by welding, to form a unit having a socket engaging a pin 57 for rotatable support, and when the spit and pan unit is to be set in position, it is dropped over pin 57 and moved downwardly thereon until the friction surface carried by the pan engages the friction surface provided on the dish 48.

The stub shaft 52 is rotated by a horizontal drive shaft 59 journalled in bearings in the canoe, there being two bearings in that portion of the canoe which is external with reference to the standard 22, one of these bearings being indicated at 60 and the other at 61. The bearing 61 is located adjacent the inner end of the drive shaft 59, and adjacent this bearing the drive shaft carries a worm 62 engaging a worm wheel 63 fixed to shaft 52. At its other end the shaft 59 is mounted in bearings 64 and 65 carried by that part of the canoe which is located within standard 22. This part of the canoe is provided with a flat closed bottom, and with integral upstanding flanges or side walls 66 that are attached, as by welding, to the lower part of a long sleeve 67 that is guided on the guide rod 43.

Extending upwardly through the bottom of the canoe, in that part which is disposed near the open edge portion of the standard, is a vertical screw spindle 68, which is rotated to accomplish the raising and lowering of the base member 21; and the drive shaft 59, through which rotation of the spits is effected, is rotated from the screw spindle 68 by gearing, which in this case includes a worm 69 pinned on shaft 59 between the bearings 64 and 65, and engaging a sleeve 70 having a worm thread 71 at the lower part thereof for engaging worm 69. The screw spindle 68 in this instance is rotated by a suitable electric motor, generally indicated at 72, mounted on the base extension at one side of the standard. As shown in Fig. 3, this motor has a shaft 73 carrying at the under part of the base a pulley 74, over which runs a belt 75, which belt is also engaged by a large pulley 76 that is fixed on the lower extremity of the screw spindle. This lower extremity is disposed below the top of the base 23, and in a socket of the base above the pulley 76 a lower bearing 77 for the screw spindle is provided, engaged by a thrust collar 78 on the screw spindle.

At the upper extremity of screw spindle 68 is a cylindrical part 79, supported at its lower end on a small thrust bearing 80 placed in the bottom of a socket 81 provided in the upper end of the sleeve 70, previously mentioned. The sleeve 70 is provided with the external threads 71 at the lower part thereof, and it is provided interiorly with a screw thread engaging the thread of the screw spindle, the sleeve thread extending throughout the length of the sleeve with the exception of the socketed part 81. The sleeve, in the portion below the socketed part 81, is journalled by an anti-friction bearing 82 in a cup-shaped bearing member 83 projecting upwardly from the floor of the canoe, and having an extension 84 projecting downwardly through an opening in the bottom of the canoe and secured in place by a nut 85. Thus the sleeve has a lower bearing in the part 84, and an anti-friction bearing intermediate of its ends.

Figure 10:
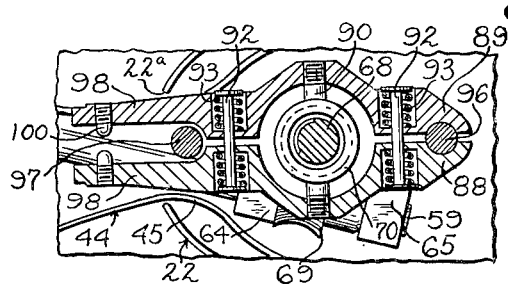
Fig. 10 is a horizontal sectional view illustrating certain parts shown in Fig. 7 in a position which they assume when the base member is in a lowered position.

Over the cup-shaped bearing member 83 is a lid or cover 86 arranged to hold the anti-friction bearing 82 in place, and having an aperture through which the sleeve 70 projects upwardly. Placed on top of the cover 86 is a clamping device arranged to clamp the sleeve 70 by its protruding end, which device, in its entirety, is indicated at 87. This device comprises a pair of parallel jaw members 88 and 89, arranged generally parallel to the longer axis of the cross section of standard 22, and acted upon by springs which normally act to clamp the sleeve 70 against rotation. The intermediate parts of the jaw members are curved and in spaced relation to the top of the sleeeve, and for engaging the top of the sleeve clamping pins 90 are threaded through the walls of the jaw members, the inner ends of said pins being adapted to engage a hardened peripheral surface 91 provided upon the sleeve. The jaws are guided for motion toward and away from each other by pins 92 arranged in sockets of the jaws, and in these sockets are compression springs 93 which urge the jaws toward each other. The jaws are, however, held apart to a certain extent, and held in position relatively to their support by screw members 94 and 95 having cylindrical bodies 96 and 97 engaged in socketed portions in the opposed faces of the jaws. The screws 94 and 95 pass through holes in the cover 86 and into threaded sockets in the member 83 so as to hold the cover in place. The body 96 of screw 94 is set in approximately semi-cylindrical recesses in the jaws, and the body 97 is placed between tail portions 98 provided on the jaws, the arrangement being such that, while the jaws are at all times generally parallel to each other, a slight pivoting movement may take place with reference to screw 94 as an axis. This movement takes place, for example, when the closure member of the cooking chamber is about to reach the position shown in Fig. 6, in which position the jaws of the clamping device 87 move upwardly over a depending finger 99 carried by the annular member 26. The tail portions 98 of the jaws are provided with inwardly extended contact members 100 having rounded ends, and as the jaws ride up against the finger or downward projection 99, the tail portions of the jaws are wedged apart so as to shift the jaws in opposition to their springs, and thereby release the clamping members 90 from the sleeve 70. Fig. 7 shows the jaws in this releasing position, and Fig. 10 shows them in the sleeve-engaging or clamping position.

When the jaws are in the clamping position and the sleeve is held against rotation in the bearing member 83, the sleeve acts as a nut located on the screw spindle, and as the spindle is rotated in one direction the closure member of the cooking chamber is raised, whereas, when the spindle is turned in the opposite direction, the closure member is lowered. When, however, the closure member reaches its chamber-closing position, shown in Fig. 4, at the end of its upward movement, the sleeve 70 is released for rotation so that it is able to turn with the screw spindle, and therefore there is no further raising of the closure member. Moreover, when the sleeve starts its rotation relatively to its enclosing bearing or housing, the worm 69 is set in rotation, thus turning the drive shaft 59, and starting the rotation of the spits, which rotation continues as long as the closure member remains in the closing position. These effects are produced by the engagement of the tail portions of the jaws with the depending finger 99, thereby releasing the friction clutch which normally holds the sleeve 70 from rotation.

Figure 9:
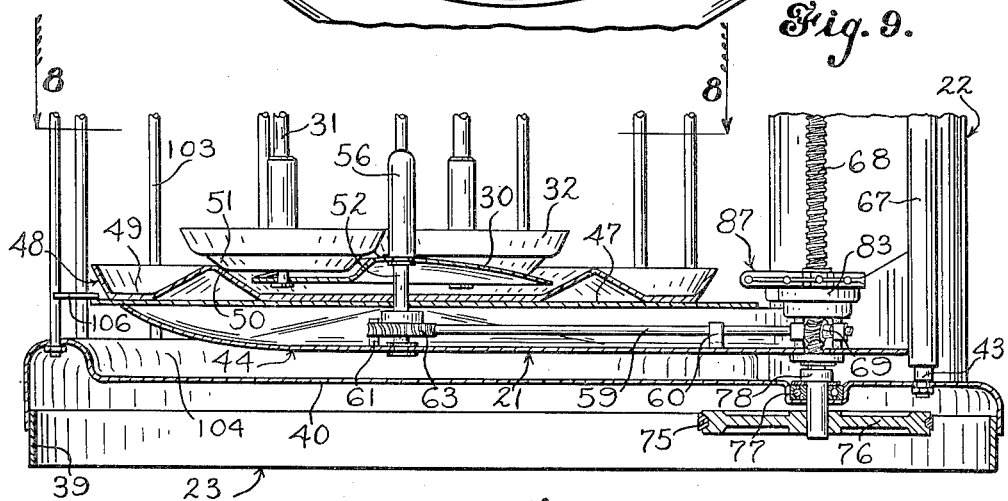
Fig. 9 is a fragmentary vertical section of the apparatus, showing the base member of the cooking chamber in its lowermost position.

When the closure member is lowered to the position shown in Fig. 9, with the sleeve 70 acting as a nut, resistance is encountered when the extension 84 of member 83 comes against the collar 78 of the screw spindle, and the closure member can have no further downward movement. At this stage there is slipping of the friction clutch associated with the sleeve 70. When this occurs, the sleeve 70 turns with the screw spindle, rubbing against the clamping pins, and no longer acts as a nut. However, the motor is usually stopped immediately when the lowermost position of the closure member is reached, in order to permit loading or unloading of the spits.

The motor 72, which rotates the screw spindle, is a reversible motor, so that the spindle can be rotated in opposite directions. This motor is under the control of a reversing switch of appropriate structure, having in this case a swinging handle or lever 101 which has an off or neutral position and can be swung to the right or left to cause the motor to rotate in one direction or the other. In the present case the switch proper is not shown, but it is mounted in a casing 102 placed on the upper end of the motor. The present application is not concerned with the particular circuit connections employed in conjunction with the closure-operating motor and/or the heating elements.

It has been previously indicated that the annular member 26 at the lower end of the chamber is supported chiefly by rod members interposed between the annular member and the base 23. In the form shown, the space below the cooking chamber is closed off by guard rods providing an approximately semi-circular grid in a location which is remote from the motor 72. These guard rods, which are indicated at 103, connect the base 23 with the member 26, and they extend upwardly from a raised portion 104 adjacent the periphery of the base. The purpose of this arrangement is to enable the operator, while attending to the operation of the motor switch 101, to be in a position to place articles of food upon or remove them from the spits when the closure member is in the lowered position, while at the same time closing off the space beneath the cooking chamber at the opposite side, thus preventing unauthorized entry into this space while the attendant is working, which might cause injury to onlookers.

In addition to the guard rods 103 just mentioned, there is in this form an additional rod 105 in a location adjacent the motor, which also serves as a member spacing the member 26 upwardly from the base.

The closure member of the cooking chamber is effectively guided and supported upon the rod 43 within the standard, and by the screw spindle supported on the base, which screw spindle passes upwardly into the closure member. As a further provision against lateral dislocation of the closure member with respect to the cooking chamber, the cover 47 of the canoe can be provided at the leftward extremity (Fig. 4) with a guidepiece 106 engaging one of the guard bars 103 in a manner such that the extremity of the closure member is guided up and down along the guard bar in question. In the main, however, the closure member, which has no support under its leftward side or end (Fig. 4), and which extends somewhat to the right of the cooking chamber, is effectively supported at the extended righthand portion by the vertically guided member located within the hollow standard and arranged at the extremity of the canoe portion of the closure member, and by the threaded spindle which is also housed within the hollow standard and located near the extremity of the closure member but at an appreciable distance therefrom. As the rod 43 guides the closure member at the extremity of the latter, and the screw spindle guides the closure member at a point spaced away from the extremity, lateral swinging movement of the closure member is inhibited. The closure member, as will be apparent, is in the nature of a cantilever by reason of its being supported from beneath at one end only. The long sleeve or tube sliding on the rod 43 effectively prevents tilting in a vertical plane.

As shown in Fig. 4, there is a space around the edge of the dish member 48 for the entrance of atmospheric air, which air moves over the water or other liquid in the trough 49 so as to entrain vapor, which moves upwardly over the articles being cooked to the upper outlet.

Various changes in the organization of parts and in the details can be made without departure from the principles of the invention or the scope of the claims.

What I claim is:

1. In apparatus of the character described, a base, a casing spaced upwardly from the base, said casing being open at the bottom, a laterally extending closure member for the casing member, a plurality of vertical rotary spits carried by the closure member, a substantially horizontal drive shaft for the spits located in a space within the closure member, a vertical rotary screw spindle for lifting and lowering said closure member, and means operable only when the closure member is in position to close said casing member for rotating said drive shaft from said spindle.

2. In cooking apparatus, the combination of a vertically movable laterally extending closure member for a chamber, a vertical screw spindle for traversing said member, a rotatable nut carried by the closure member and engaging said spindle, a clutch between said closure member and said nut, said clutch being a friction clutch engageable with one end of the nut and having opposite spring-pressed jaws normally frictionally engaged with the nut and means acting between said jaws for opening the latter and thereby disengaging the clutch.

3. In cooking apparatus, the combination of a vertically movable laterally extending closure member for a chamber, a vertical screw spindle for traversing said member, a rotatable nut carried by the closure member and engaging said spindle, a clutch between said closure member and said nut, said clutch being a friction clutch engageable with and disengageable from one end of the nut and having opposite spring-pressed jaws normally frictionally engaged with the nut, and means operable at a point in the travel of the closure member under feed by the traversing spindle for disengaging the clutch.

4. In cooking apparatus, the combination of a traversable chamber closing member, a sleeve nut rotatably supported therein, a threaded traversing spindle engaging said nut, a spit-drive means arranged to be driven from said nut when the nut rotates relatively to the closure member, a clutch device between the nut and the closure member which when engaged locks the nut against rotation and when disengaged permits rotation thereof, spring means normally holding the clutch in the engaged position, and means operable at a point in the travel of the closure member under feed by the traversing spindle for disengaging the clutch.

5. In a cooking apparatus, the combination of a base, a casing providing an interior chamber spaced upwardly from said base and open at the bottom, supporting means interposed between said base and said casing for supporting the casing, a closure member having an elongated element at its lower part under said casing, a plurality of upright rotary spits carried by the closure member, a horizontal drive shaft for the spots located in a space within the closure member and extending laterally to one extremity of said element, and a vertical rotary screw spindle adjacent said extremity of said element for supporting and vertically moving said closure member, said spindle being operatively connectible with said drive shaft to rotate the latter.

6. In cooking apparatus, the combination of a vertically movable laterally extending closure member for a chamber, a vertical rotary screw spindle for traversing said member, a rotatable nut carried by the closure member and engaging said spindle, a clutch between said closure member and said nut and carried by said closure member, said clutch being normally engaged, and means operable at a point in the travel of the closure member under feed by the traversing spindle for disengaging the clutch.

7. In a cooking apparatus, the combination of a base, a casing providing a chamber spaced upwardly from said base and open at the bottom, a closure member vertically movable under said casing and having at the lower part thereof an elongated element, a plurality of rotary spits carried by said closure member, a rotatable sleeve threaded interiorly and exteriorly and carried by said elongated element at one extremity thereof, a clutch between said closure member and said sleeve, a horizontal drive shaft for said spits operatively connected to the exterior threads of said sleeve, a hollow supporting standard rising from said base at one side of the casing and adjacent said extremity of the elongated element and supporting said casing, a vertical rotary screw spindle within said standard engaging the interior threads of said sleeve for supporting and traversing said closure member, guide means within said standard comprising a vertical rod part engaging a co-acting tubular part, one of said parts being fixed to said extremity of the elongated element, and means operable at a point in the travel of the closure member under feed by said traversing spindle for disengaging the clutch, said clutch being a friction clutch having opposite spring-pressed jaws normally frictionally engaged with said sleeve, and said spits being rotated only when said clutch is disengaged.

8. In a cooking apparatus, the combination of a base, a casing providing a chamber spaced upwardly from said base and open at the bottom, a closure member vertically movable under said casing and having at the lower part thereof an elongated element, a plurality of rotary spits carried by said closure member, a rotatable sleeve threaded interiorly and exteriorly and carried by said elongated element at one extremity thereof, a clutch between said closure member and said sleeve, a horizontal drive shaft for said spits operatively connected to the exterior threads of said sleeve, a vertical rotary screw spindle adjacent said extremity of the elongated element and engaging the interior threads of said sleeve for supporting and traversing said closure member, means for engaging said clutch to traverse said closure member, and means to disengage said clutch to rotate said drive shaft for the spits.

9. In cooking apparatus, the combination of a traversable chamber closing member, a sleeve nut rotatably supported therein, a threaded rotary traversing spindle engaging said nut, a spit-drive means comprising a shaft arranged to be driven from said nut when the nut rotates relatively to the closure member, and a clutch between the nut and the closure member.

10. In cooking apparatus, the combination of a laterally extending chamber-closing member for movement and support on a lead screw, a sleeve nut rotatably supported therein, a lead screw engaging said nut, a rotary spit carried by said member, and a drive shaft for the spit carried by the closure member and driven from said nut.

11. In cooking apparatus, the combination of a base, a casing providing an interior chamber spaced upwardly from said base and open at the bottom, supporting means interposed between said base and said casing for supporting the casing, a vertically movable closure member extending under said casing, rotatable spits carried by said closure member, a vertical rotary screw spindle for supporting said closure member and moving it up and down, and means connected to said spindle for rotating said spits, said means for rotating the spits being operative only when the casing is closed by the closure member.

EDMOND J. FINIZIE.

REFERENCES CITED

The following references are of record in the file of this patent:

UNITED STATES PATENTS

| Number | Name | Date |
| --- | --- | --- |
| 438,913 | Deblieux | Oct. 21, 1890 |
| 1,668,781 | Pierce | May 8, 1928 |
| 1,882,093 | Rambusch | Oct. 11, 1932 |
| 1,986,620 | Borden et al. | Jan. 1, 1935 |
| 2,012,811 | Duffy | Aug. 27, 1935 |
| 2,187,283 | Scheutz | Jan. 16, 1940 |
| 2,377,873 | Finizie | June 12, 1945 |
| 2,379,239 | Krebs | June 26, 1945 |
| 2,401,417 | Engle | June 4, 1946 |
| 2,446,693 | Davis | Aug. 10, 1948 |